(12) United States Patent
Zhao

(10) Patent No.: US 9,085,683 B2
(45) Date of Patent: Jul. 21, 2015

(54) NUCLEATING AGENT COMPOSITION FOR ENHANCING RIGIDITY AND TOUGHNESS OF POLYPROPYLENE

(75) Inventor: Wen-lin Zhao, Guangdong (CN)

(73) Assignee: GCH Technology Co., Ltd., Guangzhou (CN)

( * ) Notice: Subject to any disclaimer, the term of this patent is extended or adjusted under 35 U.S.C. 154(b) by 220 days.

(21) Appl. No.: 13/642,350

(22) PCT Filed: Apr. 19, 2011

(86) PCT No.: PCT/CN2011/073033
§ 371 (c)(1),
(2), (4) Date: Oct. 19, 2012

(87) PCT Pub. No.: WO2011/131123
PCT Pub. Date: Oct. 27, 2011

(65) Prior Publication Data
US 2013/0037743 A1  Feb. 14, 2013

(30) Foreign Application Priority Data
Apr. 20, 2010 (CN) .......................... 2010 1 0156027

(51) Int. Cl.
C08L 23/12 (2006.01)
C08K 5/098 (2006.01)
C08K 5/526 (2006.01)
C08K 5/00 (2006.01)

(52) U.S. Cl.
CPC ................ *C08L 23/12* (2013.01); *C08K 5/098* (2013.01); *C08K 5/526* (2013.01); *C08K 5/0083* (2013.01)

(58) Field of Classification Search
CPC ...... C08K 5/0083; C08K 5/098; C08K 5/526; C08L 23/12; C08L 2666/02
See application file for complete search history.

(56) References Cited

U.S. PATENT DOCUMENTS

| | | | | |
|---|---|---|---|---|
| 6,143,813 A * | 11/2000 | Sezume et al. | ................ | 524/127 |
| 2003/0199658 A1 * | 10/2003 | Dotson | ........................ | 526/351 |
| 2003/0236329 A1 * | 12/2003 | Kawamoto et al. | ........... | 524/136 |
| 2004/0096653 A1 * | 5/2004 | Cowan et al. | ................ | 428/364 |
| 2004/0171724 A1 * | 9/2004 | Seip et al. | ..................... | 524/128 |
| 2005/0197456 A1 * | 9/2005 | Nicolini et al. | ............... | 525/191 |
| 2006/0099415 A1 * | 5/2006 | Morin | ........................... | 428/364 |
| 2007/0093605 A1 * | 4/2007 | Adur | ............................ | 525/242 |
| 2010/0004378 A1 * | 1/2010 | Ommundsen et al. | ........ | 524/528 |
| 2010/0168353 A1 * | 7/2010 | Sheard et al. | ................. | 526/191 |
| 2011/0015307 A1 * | 1/2011 | Fukushima et al. | ............ | 524/13 |
| 2011/0015316 A1 * | 1/2011 | Zummallen | ................... | 524/115 |
| 2012/0130018 A1 * | 5/2012 | Sheard et al. | ................. | 525/240 |

FOREIGN PATENT DOCUMENTS

| | | |
|---|---|---|
| CN | 1233629 | 11/1999 |
| CN | 1521203 | 8/2004 |
| CN | 101190983 A | 6/2008 |
| CN | 101402784 A | 4/2009 |
| CN | 101845171 | 9/2010 |
| WO | WO 2006/044186 A1 | 4/2006 |

OTHER PUBLICATIONS

International Search Report and Written Opinion of the International Searching Authority for Application No. PCT/CN2011/073033, dated Jul. 14, 2011.

International Search Report and Written Opinion from international Application No. PCT/CN2010/072546, dated Jan. 27, 2011.

* cited by examiner

*Primary Examiner* — Joseph D Anthony
(74) *Attorney, Agent, or Firm* — Alston & Bird LLP

(57) ABSTRACT

A nucleating agent composition for increasing rigidity and toughness of polypropylene is provided. The nucleating agent composition comprises a carboxylate nucleating agent and a phosphate nucleating agent. The carboxylate nucleating agent is selected from the group consisting of sodium benzoate and hydroxyl aluminum para-tertiary butyl benzoate, and the phosphate nucleating agent is selected from any one of sodium 2,2'-methylene-di(4,6-di-t-butyl phenyl) phosphate and aluminum bis[2,2'-methylene-di(4,6-di-t-butylphenyl)] phosphate. The nucleating agent composition according to the present invention not only can significantly improve the bending modulus and thermal deformation temperature of polypropylene, but also can improve the impact strength of polypropylene.

2 Claims, No Drawings

NUCLEATING AGENT COMPOSITION FOR ENHANCING RIGIDITY AND TOUGHNESS OF POLYPROPYLENE

FIELD OF THE INVENTION

The present invention generally relates to polypropylene nucleating agents and, more particularly, relates to a nucleating agent composition for enhancing rigidity and toughness of polypropylene.

BACKGROUND OF THE INVENTION

Polyolefin resin, for example polypropylene, is one kind of thermoplastics widely used due to desirable processing property, chemical resistance, electrical properties and mechanical properties. Thermoplastic refers to a plastic which can be softened to flow upon exposure to sufficient heat but will retain its solidified state upon cooling. Thermoplastic can be used to manufacture various kinds of injection-molding items, for example, daily necessities, medical devices, electrical appliances and plastic pipes for use in vehicles and tubes.

During solidification and crystallization of a polymer melt, a long relaxation time is needed for long-chain of macromolecule to change from a disorder state to an ordered crystalline state. Crystallization rate and crystallization temperature is generally low, which may lead to formation of big-size spherocrystals and obvious interfaces between different spherocrystals. The obvious interfaces between different big-size spherocrystals may induce different internal stress. Upon impact, cracks may form at the interfaces, which may further lead to break of the solidified polymer. When nucleating agent is added into the polypropylene melt, the nucleating agent can provides adequate crystal nucleus. Therefore, during cooling, the polypropylene melt can form much more small-size, orderly arranged, compactly and evenly dispersed spherocrystals. Accordingly, the internal stress generated is small and disperse, which can improve mechanical properties and thermal properties of polypropylene and further promote the application of polypropylene.

Generally, rigidity of polypropylene is represented by bending modulus, and toughness of polypropylene is represented by impact strength.

To modify a conventional polypropylene as a functional material having desirable physical properties, for example, high rigidity, desirable impact resistance and thermal stability, nucleation modification is one of the most simple and effective methods. Adding nucleating agent(s) in polypropylene can induce polypropylene to form orderly arranged and well-dispersed small spherocrystals, which may improve the physical properties of polypropylene. Different nucleating agent may induce polypropylene to form different crystalline state, and further present different physical properties. However, it may be seen that each nucleating agent having specific molecular structure has its advantages and disadvantages, i.e. each nucleating agent can hardly simultaneously improve various kinds of physical properties of polypropylene. For instance, phosphate nucleating agents (e.g. sodium 2,2'-methylene-bis (4,6-di-tert-butylphenyl) phosphate and aluminum bis[2,2'-methylene-bis (4,6-di-tert-butylphenyl)] phosphate) and carboxylate nucleating agents (e.g. aluminum p-tert-butyl benzoate hydroxide) can improve the rigidity and thermal deformation temperature of polypropylene. However, these nucleating agents can hardly improve the toughness of polypropylene.

Different nucleating agents may differently improve mechanical properties and/or thermal properties of homo polypropylene 1120 available from FORMOSA PLASTICS CORPORATION, TW. Almost all of the nucleating agents can improve the bending modulus and thermal deformation temperature of homo polypropylene 1120, but cannot significantly improve the impact strength of homo polypropylene 1120 at ambient temperature.

Dibenzylidene sorbitol nucleating agent (DBS) can reduce haze of polypropylene. However, dibenzylidene sorbitol nucleating agent cannot contribute to improvement of other properties of polypropylene. It is difficult to use a single nucleating agent to improve the impact strength and bending modulus of polypropylene. The nucleating agent composition according to the embodiments of the present invention is aimed to increasing the toughness and rigidity of polypropylene at the same time.

CN 101358012 discloses a composition containing 0.2 to 0.3% by weight 1,3,2,4-dibenzylidene sorbitol and remaining residual random copolymerized polypropylene. The composition of CN 101358012 can be used to improve the rigidity and thermal equilibrium temperature of polypropylene, which is different from the nucleating agent composition according to the present invention.

CN 101190983A discloses a method of producing high-gloss heat-resistance polypropylene having an improved thermal deformation temperature. However, bending modulus of polypropylene is not desirable. Polypropylene modified by the nucleating agent composition according to the embodiments of the present invention not only has improved thermal deformation temperature, but also has improved bending modulus and impact strength.

What is needed, therefore, is to provide a polypropylene nucleating agent composition which not only can remarkably improve the bending modulus and thermal deformation temperature of polypropylene, but also can remarkably improve the impact strength of polypropylene.

SUMMARY OF THE INVENTION

One object of the present invention is to provide a polypropylene nucleating agent composition which not only can remarkably improve the bending modulus and thermal deformation temperature of polypropylene, but also can remarkably improve the impact strength of polypropylene.

To fully utilize advantages of different nucleating agents to improve comprehensive physical properties of polypropylene, using composition of different types of nucleating agents is one of the most effective ways.

According to one embodiment of the present invention, a nucleating agent composition is provided. The nucleating agent composition includes a carboxylate nucleating agent and a phosphate nucleating agent, wherein the carboxylate nucleating agent is selected from the group consisting of sodium benzoate and aluminum p-tert-butyl benzoate hydroxide, the phosphate nucleating agent is selected from one of sodium 2,2'-methylene-bis (4,6-di-tert-butylphenyl) phosphate and aluminum bis[2,2'-methylene-bis (4,6-di-tert-butylphenyl)] phosphate, and the weight ratio of the carboxylate nucleating agent to the phosphate nucleating agent is 1-19:19-1. When the carboxylate nucleating agent comprises sodium benzoate and aluminum p-tert-butyl benzoate hydroxide, the weight ratio of sodium benzoate to aluminum p-tert-butyl benzoate hydroxide is 1-9:9-1.

Preferably, the nucleating agent composition of the present invention is consisted of a carboxylate nucleating agent and a phosphate nucleating agent, wherein the carboxylate nucleating agent is selected from the group consisting of sodium benzoate and aluminum p-tert-butyl benzoate hydroxide, the phosphate nucleating agent is selected from one of sodium 2,2'-methylene-bis (4,6-di-tert-butylphenyl) phosphate and aluminum bis[2,2'-methylene-bis (4,6-di-tert-butylphenyl)] phosphate. The nucleating agent composition comprises 5-95% by weight carboxylate nucleating agent and 95-5% by weight phosphate nucleating agent. When the carboxylate nucleating agent contains sodium benzoate and aluminum p-tert-butyl benzoate hydroxide, the weight ratio of sodium benzoate to aluminum p-tert-butyl benzoate hydroxide is 1-9:9-1.

Preferably, one embodiment of the present invention provides a nucleating agent composition including sodium benzoate and sodium 2,2'-methylene-bis (4,6-di-tert-butylphenyl) phosphate, wherein the weight ratio of sodium benzoate to sodium 2,2'-methylene-bis (4,6-di-tert-butylphenyl) phosphate is 1-19:19-1.

Preferably, one embodiment of the present invention provides a nucleating agent composition consisting of sodium benzoate and sodium 2,2'-methylene-bis (4,6-di-tert-butylphenyl) phosphate, wherein the nucleating agent composition comprises 5-95% by weight sodium benzoate and 95-5% by weight sodium 2,2'-methylene-bis (4,6-di-tert-butylphenyl) phosphate.

Preferably, one embodiment of the present invention provides a nucleating agent composition comprising sodium benzoate and aluminum bis[2,2'-methylene-bis (4,6-di-tert-butylphenyl)] phosphate, wherein the weight ratio of sodium benzoate to aluminum bis[2,2'-methylene-bis (4,6-di-tert-butylphenyl)] phosphate is 1-19:19-1.

Preferably, one embodiment of the present invention provides a nucleating agent composition consisting of sodium benzoate and aluminum bis[2,2'-methylene-bis (4,6-di-tert-butylphenyl)] phosphate, wherein the nucleating agent composition comprises 5-95% by weight sodium benzoate and 95-5% by weight aluminum bis[2,2'-methylene-bis (4,6-di-tert-butylphenyl)] phosphate.

Preferably, one embodiment of the present invention provides a nucleating agent composition comprising aluminum p-tert-butyl benzoate hydroxide and sodium 2,2'-methylene-bis (4,6-di-tert-butylphenyl) phosphate, wherein the weight ratio of aluminum p-tert-butyl benzoate hydroxide to sodium 2,2'-methylene-Ws (4,6-di-tert-butylphenyl) phosphate is 1-19:19-1.

Preferably, one embodiment of the present invention provides a nucleating agent composition consisting of aluminum p-tert-butyl benzoate hydroxide and sodium 2,2'-methylene-bis (4,6-di-tert-butylphenyl) phosphate, wherein the nucleating agent composition comprises 5-95% by weight aluminum p-tert-butyl benzoate hydroxide and 95-5% by weight sodium 2,2'-methylene-bis (4,6-di-tert-butylphenyl) phosphate.

Preferably, one embodiment of the present invention provides a nucleating agent composition comprising aluminum p-tert-butyl benzoate hydroxide and aluminum bis[2,2'-methylene-bis (4,6-di-tert-butylphenyl)] phosphate, wherein the weight ratio of aluminum p-tert-butyl benzoate hydroxide to aluminum bis[2,2'-methylene-bis (4,6-di-tert-butylphenyl)] phosphate is 1-19:19-1.

Preferably, one embodiment of the present invention provides a nucleating agent composition consisted of aluminum p-tert-butyl benzoate hydroxide and aluminum bis[2,2'-methylene-bis (4,6-di-tert-butylphenyl)] phosphate, wherein the nucleating agent composition comprises 5-95% by weight aluminum p-tert-butyl benzoate hydroxide and 95-5% by weight aluminum bis[2,2'-methylene-bis (4,6-di-tert-butylphenyl)] phosphate.

Preferably, one embodiment of the present invention provides a nucleating agent composition comprising sodium benzoate, aluminum p-tert-butyl benzoate hydroxide and sodium 2,2'-methylene-bis (4,6-di-tert-butylphenyl) phosphate, wherein the nucleating agent composition comprises weight ratio of sodium benzoate and aluminum p-tert-butyl benzoate hydroxide to sodium 2,2'-methylene-bis (4,6-di-tert-butylphenyl) phosphate is 1-19:19-1, and the weight ratio of sodium benzoate to aluminum p-tert-butyl benzoate hydroxide is 1-9:9-1.

Preferably, one embodiment of the present invention provides a nucleating agent composition consisting of sodium benzoate, aluminum p-tert-butyl benzoate hydroxide and sodium 2,2'-methylene-bis (4,6-di-tert-butylphenyl) phosphate, wherein the nucleating agent composition comprises 5-95% and more preferably 30-70% by weight sodium benzoate and aluminum p-tert-butyl benzoate hydroxide, and 95-5% and more preferably 70-30% by weight sodium 2,2'-methylene-bis (4,6-di-tert-butylphenyl) phosphate, and wherein the weight ratio of sodium benzoate to aluminum p-tert-butyl benzoate hydroxide is 1-9:9:1.

Preferably, one embodiment of the present invention provides a nucleating agent composition comprising sodium benzoate, aluminum p-tert-butyl benzoate hydroxide and aluminum bis[2,2'-methylene-bis (4,6-di-tert-butylphenyl)] phosphate, wherein the weight ratio of sodium benzoate and aluminum p-tert-butyl benzoate hydroxide to aluminum bis[2,2'-methylene-bis (4,6-di-tert-butylphenyl)] phosphate is 1-19:19-1, and the weight ratio of sodium benzoate to aluminum p-tert-butyl benzoate hydroxide is 1-9:9:1.

Preferably, one embodiment of the present invention provides a nucleating agent composition consisting of sodium benzoate, aluminum p-tert-butyl benzoate hydroxide and aluminum bis[2,2'-methylene-bis (4,6-di-tert-butylphenyl)] phosphate, wherein the nucleating agent composition comprises 5-95% and more preferably 30-70 by weight sodium benzoate and aluminum p-tert-butyl benzoate hydroxide, and 95-5% and more preferably 70-30% by weight aluminum bis[2,2'-methylene-bis (4,6-di-tert-butylphenyl)] phosphate, and wherein the weight ratio of sodium benzoate to aluminum p-tert-butyl benzoate hydroxide is 1-9:9-1.

One embodiment of the present invention provides a use of the nucleating agent composition as previously described for improving the impact strength of polypropylene.

Preferably, one embodiment of the present invention provides a use of the nucleating agent composition as previously described for improving the bending modulus and thermal deformation temperature of polypropylene, as well as the impact strength of polypropylene.

One embodiment of the present invention provides a mixture of the nucleating agent composition as previously described and polypropylene, wherein weight percentage of the nucleating agent composition in polypropylene is 0.01-2.00%, 0.05-1.00%, 0.05-0.50% or 0.05-0.15%.

Additionally, other additives can also be added into the mixture of the nucleating agent composition as previously described and polypropylene, so as to improve other properties of polypropylene.

The nucleating agent composition according to the embodiments of the present invention can overcome the disadvantage of single nucleating agent being incapable of improving the toughness and rigidity of polypropylene at the same time, and fully utilize the advantage of each single nucleating agent in the nucleating agent composition, so as to significantly improve the toughness, rigidity and thermal deformation temperature of polypropylene at the same time.

Polypropylene modified by the nucleating agent composition according to the embodiments of the present invention can endure long-time high temperature and mechanical stress and, therefore, can be widely used in manufacturing of daily necessities, medical devices, electrical appliances, and plastic pipes for use in vehicles and tubes.

The nucleating agent composition according to the embodiments of the present invention has stable chemical properties and can be evenly dispersed in polypropylene. Content of different ingredients in the nucleating agent composition can be adjusted according to different actual requirements, so as to be used to improve the toughness and rigidity of various kinds of polypropylenes.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

1. Materials Used in the Examples

Carboxylate: aluminum p-tert-butyl benzoate hydroxide and sodium benzoate available in the market.

Phosphate: sodium 2,2'-methylene-bis (4,6-di-tert-butylphenyl) phosphate and aluminum bis[2,2'-methylene-bis (4,6-di-tert-butylphenyl)] phosphate available in the market.

Polyolefin: homo polypropylene PP-1120 and polypropylene copolymer PP-J641 available in the market 2. Preparation of Examples of Nucleating Agent Composition

EXAMPLE 1

5 g sodium benzoate and 5 g sodium 2,2'-methylene-bis (4,6-di-tert-butylphenyl) phosphate were added into a mixer and fully mixed to thereby prepare nucleating agent composition 1.

EXAMPLE 2

1 g sodium benzoate and 9 g aluminum bis[2,2'-methylene-bis (4,6-di-tert-butylphenyl)] phosphate were added into a mixer and fully mixed to thereby prepare nucleating agent composition 2.

EXAMPLE 3

5 g sodium benzoate and 5 g aluminum bis[2,2'-methylene-bis (4,6-di-tert-butylphenyl)] phosphate were added into a mixer and fully mixed to thereby prepare nucleating agent composition 3.

EXAMPLE 4

1 g aluminum p-tert-butyl benzoate hydroxide, 8 g sodium benzoate and 1 g sodium 2,2'-methylene-bis (4,6-di-tert-butylphenyl) phosphate were added into a mixer and fully mixed to thereby prepare nucleating agent composition 4.

EXAMPLE 5

2 g aluminum p-tert-butyl benzoate hydroxide, 4 g sodium benzoate and 4 g sodium 2,2'-methylene-bis (4,6-di-tert-butylphenyl) phosphate were added into a mixer and fully mixed to thereby prepare nucleating agent composition 5.

EXAMPLE 6

1 g aluminum p-tert-butyl benzoate hydroxide, 1 g sodium benzoate and 8 g aluminum bis[2,2'-methylene-bis (4,6-di-tert-butylphenyl)] phosphate were added into a mixer and fully mixed to thereby prepare nucleating agent composition 6.

EXAMPLE 7

4 g aluminum p-tert-butyl benzoate hydroxide, 2 g sodium benzoate and 4 g aluminum bis[2,2'-methylene-bis (4,6-di-tert-butylphenyl)] phosphate were added into a mixer and fully mixed to thereby prepare nucleating agent composition 7.

EXAMPLE 8

3 g aluminum p-tert-butyl benzoate hydroxide, 3 g sodium benzoate and 3 g aluminum bis[2,2'-methylene-bis (4,6-di-tert-butylphenyl)] phosphate were added into a mixer and fully mixed to thereby prepare nucleating agent composition 8.

3. Preparation of Polypropylene Samples

Preparation of Sample 1

To 1000 g block co-polymerized polypropylene J641 was respectively added 0.5 g, 1.0 g, 1.5 g nucleating agent composition 1 and fully mixed in a high speed mixer for 5 minutes. The mixture was screwed via twin-screw extruder and was further injection molded to thereby prepare samples 1, wherein the extrusion temperature ranges from 190 to 210□, and the temperature in the injection moulding machine ranges from 220 to 230□.

Preparation of Sample 2

To 1000 g homo polypropylene 1120 was respectively added 0.5 g, 1.0 g, 1.5 g nucleating agent composition 2 and fully mixed in a high speed mixer for 5 minutes. The mixture was screwed via twin-screw extruder and was further injection molded to thereby prepare sample 2, wherein the extrusion temperature ranges from 190 to 210□, and the temperature in the injection moulding machine ranges from 220 to 230° C.

Similarly, sample 2 was repeated to thereby prepare samples 3, 4, 5, 6, 7 and 8, except that nucleating agent composition 3, 4, 5, 6, 7 and 8 were used instead of nucleating agent composition 2.

4. Preparation of Comparative Polypropylene Samples 1.0 g sodium benzoate and 1.0 g sodium 2,2'-methylene-bis (4,6-di-tert-butylphenyl) phosphate was respectively added into 1000 g block co-polymerized polypropylene J641 and fully mixed in a high speed mixer for 5 minutes. The mixture was screwed via twin-screw extruder and was further injection molded to thereby prepare comparative sample I and comparative sample II, wherein the extrusion temperature ranges from 190 to 210□, and the temperature in the injection moulding machine ranges from 220 to 230□.

1.0 g sodium benzoate, 1.0 g aluminum p-tert-butyl benzoate hydroxide, 1.0 g sodium 2,2'-methylene-bis (4,6-di-tert-butylphenyl) phosphate and 1.0 g aluminum bis[2,2'-methylene-bis (4,6-di-tert-butylphenyl)] phosphate was respectively added into 1000 g homo polypropylene 1120 and fully mixed in a high speed mixer for 5 minutes. The mixture was screwed via twin-screw extruder and was further injection molded to thereby prepare comparative sample A, comparative sample B, comparative sample C and comparative sample D, wherein the extrusion temperature ranges from 190 to 210° C., and the temperature in the injection moulding machine ranges from 220 to 230° C.

5. Mechanical Properties and Thermal Properties Test

Test of polypropylene modified by nucleating agent composition according to the embodiments of the present invention was carried out according to regulations of Chinese National Standards GB 2918-1998(state adjustment of plastic samples and standard surroundings of test), i.e. test was carried out at temperature of 23±2☐ and at relative humidity (RI-I) of 50±5%. The period for sample state adjustment is 48 hours. Physical properties test was carried out according to Chinese National Standards GB/T 1843-1996 for notched izod impact strength, GB/T9341-2000 for bending modulus, GB/T 1634-2004 for thermal deformation temperature. Test results are shown in table 1 to table 8.

TABLE 1

Mechanical and thermal properties of block co-polymerized polypropylene J641 modified by nucleating agent composition 1 (example 1)

| Sample | Concentration of nucleating agent (ppm) | Impact strength (KJ/m$^2$) | Bending modulus (MPa) | Thermal deformation temperature (° C.) |
|---|---|---|---|---|
| Comparative sample I | 1000 | 59.25 | 821.1 | 82.7 |
| Comparative sample II | 1000 | 58.72 | 923.4 | 94.5 |
| Sample 1 | 500 | 66.74 | 892.1 | 93.2 |
| Sample 1 | 1000 | 67.75 | 925.1 | 95.3 |
| Sample 1 | 1500 | 67.83 | 946.7 | 96.1 |

Test result shows that, polypropylene modified by 1000 ppm of nucleating agent composition 1 has higher impact strength than that of polypropylene modified by 1000ppm of single nucleating agent sodium benzoate, also than that of polypropylene modified by 1000 ppm of single nucleating agent sodium 2,2'-methylene-bis (4,6-di-tert-butylphenyl) phosphate. At the same time, polypropylene modified by 1000 ppm of nucleating agent composition 1 has bending modulus and thermal deformation temperature no less than that of polypropylene modified by 1000 ppm of single nucleating agent sodium benzoate, and that of polypropylene modified by 1000 ppm of single nucleating agent sodium 2,2'-methylene-bis (4,6-di-tert-butylphenyl) phosphate.

TABLE 2

Mechanical and thermal properties of homo polypropylene 1120 modified by nucleating agent composition 2 (example 2)

| Sample | Concentration of nucleating agent (ppm) | Impact strength (KJ/m$^2$) | Bending modulus (MPa) | Thermal deformation temperature (° C.) |
|---|---|---|---|---|
| Comparative sample A | 1000 | 2.03 | 1449.5 | 89.2 |
| Comparative sample D | 1000 | 2.08 | 1704.3 | 109.9 |
| Sample 2 | 500 | 2.51 | 1420.6 | 102.4 |
| Sample 2 | 1000 | 2.64 | 1555.8 | 110.3 |
| Sample 2 | 1500 | 2.79 | 1680.7 | 111.2 |

Test result shows that, polypropylene modified by 1000 ppm of nucleating agent composition 2 has higher impact strength than that of polypropylene modified by 1000 ppm of single nucleating agent sodium benzoate, and that of polypropylene modified by 1000 ppm of single nucleating agent aluminum bis[2,2'-methylene-bis (4,6-di-tert-butylphenyl)] phosphate.

TABLE 3

Mechanical and thermal properties of homo polypropylene 1120 modified by nucleating agent composition 3 (example 3)

| Sample | Concentration of nucleating agent (ppm) | Impact strength (KJ/m$^2$) | Bending modulus (MPa) | Thermal deformation temperature (° C.) |
|---|---|---|---|---|
| Comparative sample A | 1000 | 2.03 | 1449.5 | 89.2 |
| Comparative sample D | 1000 | 2.08 | 1704.3 | 109.9 |
| Sample 3 | 500 | 2.59 | 1556.1 | 101.5 |
| Sample 3 | 1000 | 2.86 | 1687.1 | 108.4 |
| Sample 3 | 1500 | 2.91 | 1732.7 | 113.9 |

Test result shows that, polypropylene modified by 1000 ppm of nucleating agent composition 3 has higher impact strength than that of polypropylene modified by 1000 ppm of single nucleating agent sodium benzoate, and that of polypropylene modified by 1000 ppm of single nucleating agent aluminum bis[2,2'-methylene-bis (4,6-di-tert-butylphenyl)] phosphate.

TABLE 4

Mechanical and thermal properties of homo polypropylene 1120 modified by nucleating agent composition 4 (example 4)

| Sample | Concentration of nucleating agent (ppm) | Impact strength (KJ/m$^2$) | Bending modulus (MPa) | Thermal deformation temperature (° C.) |
|---|---|---|---|---|
| Comparative sample A | 1000 | 2.03 | 1449.5 | 89.2 |
| Comparative sample B | 1000 | 2.03 | 1616.3 | 101.5 |
| Comparative sample C | 1000 | 2.12 | 1683.9 | 106.7 |
| Sample 4 | 500 | 2.66 | 1687.6 | 106.7 |
| Sample 4 | 1000 | 2.77 | 1661.5 | 109.8 |
| Sample 4 | 1500 | 2.80 | 1689.2 | 110.3 |

Test result shows that, polypropylene modified by 1000 ppm of nucleating agent composition 4 has higher impact strength than that of polypropylene modified by 1000 ppm of single nucleating agent sodium benzoate, than that of polypropylene modified by 1000 ppm of single nucleating agent aluminum p-tert-butyl benzoate hydroxide, and than that of polypropylene modified by 1000 ppm of single nucleating agent sodium 2,2'-methylene-bis (4,6-di-tert-butylphenyl) phosphate.

TABLE 5

Mechanical and thermal properties of homo polypropylene 1120 modified by nucleating agent composition 5 (example 5)

| Sample | Concentration of nucleating agent (ppm) | Impact strength (KJ/m$^5$) | Bending modulus (MPa) | Thermal deformation temperature (° C.) |
|---|---|---|---|---|
| Comparative sample A | 1000 | 2.03 | 1449.5 | 89.2 |
| Comparative | 1000 | 2.03 | 1616.4 | 101.5 |

TABLE 5-continued

Mechanical and thermal properties of homo polypropylene 1120 modified by nucleating agent composition 5 (example 5)

| Sample | Concentration of nucleating agent (ppm) | Impact strength (KJ/m$^5$) | Bending modulus (MPa) | Thermal deformation temperature (° C.) |
|---|---|---|---|---|
| sample B | | | | |
| Comparative sample C | 1000 | 2.12 | 1683.9 | 106.7 |
| Sample 5 | 500 | 2.81 | 1663.5 | 103.2 |
| Sample 5 | 1000 | 3.04 | 1746.2 | 109.1 |
| Sample 5 | 1500 | 2.62 | 1775.2 | 114.9 |

Test result shows that, polypropylene modified by 1000 ppm of nucleating agent composition 5 has higher impact strength than that of polypropylene modified by 1000 ppm of single nucleating agent sodium benzoate, than that of polypropylene modified by 1000 ppm of single nucleating agent aluminum p-tert-butyl benzoate hydroxide, and than that of polypropylene modified by 1000 ppm of single nucleating agent sodium 2,2'-methylene-Ns (4,6-di-tert-butylphenyl) phosphate. At the same time, polypropylene modified by 1000 ppm of nucleating agent composition 5 also has higher bending modulus and thermal deformation temperature than that of polypropylene modified by 1000 ppm of single nucleatig sodium benzoate, than that of polypropylene modified by 1000 ppm of single nucleating agent aluminum p-tert-butyl benzoate hydroxide, and than that of polypropylene modified by 1000 ppm of single nucleating agent sodium 2,2'-methylene-bis (4,6-di-tert-butylphenyl) phosphate.

TABLE 6

Mechanical and thermal properties of homo polypropylene 1120 modified by nucleating agent composition 6 (example 6)

| Sample | Concentration of nucleating agent (ppm) | Impact strength (KJ/m$^5$) | Bending modulus (MPa) | Thermal deformation temperature (° C.) |
|---|---|---|---|---|
| Comparative sample A | 1000 | 2.03 | 1449.5 | 89.2 |
| Comparative sample B | 1000 | 2.03 | 1616.4 | 101.5 |
| Comparative sample D | 1000 | 2.08 | 1704.3 | 109.9 |
| Sample 6 | 500 | 2.66 | 1587.6 | 106.7 |
| Sample 6 | 1000 | 2.77 | 1621.5 | 109.8 |
| Sample 6 | 1500 | 2.98 | 1689.2 | 110.3 |

Test result shows that, polypropylene modified by 1000 ppm of nucleating agent composition 6 has higher impact strength than that of polypropylene modified by 1000 ppm of single nucleating agent sodium benzoate, than that of polypropylene modified by 1000 ppm of single nucleating agent aluminum p-tert-butyl benzoate hydroxide, and than that of polypropylene modified by 1000 ppm of single nucleating agent aluminum bis[2,2'-methylene-bis (4,6-di-tert-butylphenyl)] phosphate.

TABLE 7

Mechanical and thermal properties of homo polypropylene 1120 modified by nucleating agent composition 7 (example 7)

| Sample | Concentration of nucleating agent (ppm) | Impact strength (KJ/m$^2$) | Bending modulus (MPa) | Thermal deformation temperature (° C.) |
|---|---|---|---|---|
| Comparative sample A | 1000 | 2.03 | 1449.5 | 89.2 |
| Comparative sample B | 1000 | 2.03 | 1616.4 | 101.5 |
| Comparative sample D | 1000 | 2.08 | 1704.3 | 109.9 |
| Sample 7 | 500 | 2.89 | 1682.6 | 108.8 |
| Sample 7 | 1000 | 3.04 | 1780.2 | 112.5 |
| Sample 7 | 1500 | 3.10 | 1795.8 | 116.3 |

Test result shows that, polypropylene modified by 1000 ppm of nucleating agent composition 7 has higher impact strength than that of polypropylene modified by 1000 ppm of single nucleating agent sodium benzoate, than that of polypropylene modified by 1000 ppm of single nucleating agent aluminum p-tert-butyl benzoate hydroxide, and than that of polypropylene modified by 1000 ppm of single nucleating agent s aluminum bis[2,2'-methylene-bis (4,6-di-tert-butylphenyl)] phosphate. At the same time, polypropylene modified by 1000 ppm of nucleating agent composition 7 also has higher bending modulus and thermal deformation temperature than that of polypropylene modified by 1000 ppm of single nucleating agent of sodium benzoate, than that of polypropylene modified by 1000 ppm of single nucleating agent aluminum p-tert-butyl benzoate hydroxide, and than that of polypropylene modified by 1000 ppm of single nucleating agent aluminum bis[2,2'-methylene-bis (4,6-di-tert-butylphenyl)] phosphate.

TABLE 8

Mechanical and thermal properties of homo polypropylene 1120 modified by nucleating agent composition 8 (example 8)

| Sample | Concentration of nucleating agent (ppm) | Impact strength (KJ/m$^2$) | Bending modulus (MPa) | Thermal deformation temperature (° C.) |
|---|---|---|---|---|
| Comparative sample A | 1000 | 2.03 | 1449.5 | 89.2 |
| Comparative sample B | 1000 | 2.03 | 1616.4 | 101.5 |
| Comparative sample D | 1000 | 2.08 | 1704.3 | 109.9 |
| Sample 8 | 500 | 2.64 | 1546.4 | 106.8 |
| Sample 8 | 1000 | 2.79 | 1631.3 | 111.0 |
| Sample 8 | 1500 | 2.82 | 1693.3 | 112.1 |

Test result shows that, polypropylene modified by 1000 ppm of nucleating agent composition 8 has higher impact strength than that of polypropylene modified by 1000 ppm of single nucleating agent sodium benzoate, than that of polypropylene modified by 1000 ppm of single nucleating agent aluminum p-tert-butyl benzoate hydroxide, and than that of polypropylene modified by 1000 ppm of single nucleating agent aluminum bis[2,2'-methylene-bis (4,6-di-tert-butylphenyl)] phosphate.

In view of the test results shown in Table 1 to Table 8, polypropylene modified by nucleating agent compositions according to the embodiments of the present invention has higher impact strength than that of polypropylene modified by single nucleating agent at the same concentration. For certain preferable nucleating agent composition according to the embodiments of the present invention, at the same amount of addition, polypropylene modified by nucleating agent composition also has higher bending modulus and thermal deformation temperature than that of polypropylene been modified by single nucleating agent.

Single nucleating agent for increasing rigidity of polypropylene has one fatal defect, i.e. it can only improve rigidity and thermal deformation of polypropylene. Single component nucleating agent cannot remarkably improve the impact strength of polypropylene. Sometimes, addition of single component nucleating agent even may lead to reduce of toughness of polypropylene, which limits the usage of polypropylene in engineering plastics, such as those been used in electrical appliances and vehicles. According to the embodiments of the present invention, polypropylene modified by the nucleating agent composition of the present invention has much more desirable bending modulus, impact strength and thermal deformation temperature than those of polypropylene been modified by single nucleating agent. Especially, the impact strength of polypropylene modified by the nucleating agent composition of the present invention can sometimes increase more than 50%, which can contribute to even broader application of polypropylene.

In the forgoing specification, the invention has been described with reference to specific exemplary embodiments thereof. However, many modifications and other embodiments of the inventions set forth herein will come to mind to one skilled in the art to which these inventions pertain having the benefit of the teachings presented in the foregoing descriptions. Therefore, it is to be understood that the embodiments of the invention are not to be limited to the specific embodiments disclosed and that modifications and other embodiments are intended to be included within the scope of the appended claims. The specification is to be regarded in an illustrative rather than restrictive sense. Although specific terms are employed herein, they are used in a generic and descriptive sense only and not for purposes of limitation.

What is claimed is:

1. A nucleating agent composition, comprising sodium benzoate, aluminum p-tert-butyl benzoate hydroxide and aluminum bis[2,2'-methylene-bis (4,6-di-tert-butylphenyl)] phosphate, wherein the weight ratio of sodium benzoate to aluminum p-tert-butyl benzoate hydroxide is 1-9: 9-1.

2. A method for increasing impact strength of polypropylene, or for increasing bending modulus, thermal deformation temperature as well as impact strength of polypropylene comprising adding the nucleating agent composition of claim 1 to polypropylene.

* * * * *